US010308282B2

(12) United States Patent
Katzourakis et al.

(10) Patent No.: US 10,308,282 B2
(45) Date of Patent: Jun. 4, 2019

(54) VEHICLE STEERING ARRANGEMENT, AUTONOMOUS VEHICLE STEERING ARRANGEMENT, A VEHICLE, AND A METHOD OF STEERING A VEHICLE

(71) Applicant: VOLVO CAR CORPORATION, Gothenburg (SE)

(72) Inventors: Diomidis Katzourakis, Chania (GR); Caspar Hanselaar, Leiderdoop (NL); Mathias Lidberg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 229 days.

(21) Appl. No.: 15/367,266

(22) Filed: Dec. 2, 2016

(65) Prior Publication Data

US 2017/0158227 A1 Jun. 8, 2017

(30) Foreign Application Priority Data

Dec. 8, 2015 (EP) .................................... 15198393

(51) Int. Cl.
*B62D 6/00* (2006.01)
*B62D 15/02* (2006.01)

(52) U.S. Cl.
CPC ............. *B62D 6/008* (2013.01); *B62D 6/002* (2013.01); *B62D 6/006* (2013.01); *B62D 6/007* (2013.01);
(Continued)

(58) Field of Classification Search
None
See application file for complete search history.

(56) References Cited

U.S. PATENT DOCUMENTS 5,709,281 A * 1/1998 Sherwin ............... B62D 5/0466
180/169
6,823,245 B2 * 11/2004 Sugitani .................. B60T 8/172
340/438
(Continued)

FOREIGN PATENT DOCUMENTS

DE   102009020157 A1   11/2010
EP       2803558 A2    11/2014
JP      2007001449 A    1/2007

OTHER PUBLICATIONS

Extended European Search Report dated May 25, 2016, Application No. 15198393.9-1755, Applicant Volvo Car Corporation, 9 Pages.

*Primary Examiner* — Navid Ziaeianmehdizadeh
(74) *Attorney, Agent, or Firm* — Brooks Kushman P.C.

(57) ABSTRACT

A vehicle steering arrangement for a vehicle comprises a rack a position sensor, a steering column, a steering wheel, a torque sensor arranged to sense a torque applied onto the steering wheel and arranged to provide a torque signal representative thereof, an electronic control unit provided with a virtual steering model, a rack-mounted electromechanical actuator, and a force obtaining arrangement configured to obtain forces of steered wheels acting on the rack. The electronic control unit is configured to provide a virtual rack position based on the virtual steering model and at least a combination of the obtained forces and the torque signal, and is arranged to control the rack-mounted electromechanical actuator such that the current position of the rack is controlled towards the virtual rack position. The present disclosure also relates to an autonomous vehicle steering arrangement, a vehicle and a method of steering a vehicle.

20 Claims, 3 Drawing Sheets

(52) U.S. Cl.
CPC ...... *B62D 15/025* (2013.01); *B60T 2201/087* (2013.01)

(56) References Cited

U.S. PATENT DOCUMENTS

| | | | | |
|---|---|---|---|---|
| 8,977,437 | B2* | 3/2015 | Tamaizumi | B62D 5/0469 701/42 |
| 2002/0107621 | A1* | 8/2002 | Byers | B62D 6/002 701/41 |
| 2003/0055545 | A1* | 3/2003 | Uenuma | B62D 6/008 701/41 |
| 2003/0195689 | A1* | 10/2003 | Mori | G01L 5/20 701/70 |
| 2005/0072621 | A1* | 4/2005 | Hara | B62D 1/163 180/444 |
| 2005/0082107 | A1* | 4/2005 | Husain | B62D 5/005 180/402 |
| 2006/0060412 | A1* | 3/2006 | Bolourchi | B62D 5/008 180/443 |
| 2006/0086560 | A1* | 4/2006 | Furusho | B62D 5/0463 180/446 |
| 2007/0168093 | A1* | 7/2007 | Nishiyama | B62D 5/0463 701/41 |
| 2008/0142293 | A1* | 6/2008 | Goto | B62D 6/003 180/446 |
| 2009/0078494 | A1* | 3/2009 | Dornhege | B62D 5/0472 180/446 |
| 2009/0082925 | A1* | 3/2009 | Wijffels | B62D 6/003 701/42 |
| 2012/0265403 | A1 | 10/2012 | Svensson et al. | |
| 2013/0211676 | A1* | 8/2013 | Benyo | B62D 5/0463 701/42 |
| 2013/0338879 | A1* | 12/2013 | Szabolcs | B62D 5/0463 701/42 |
| 2015/0166069 | A1* | 6/2015 | Engelman | B60W 30/12 701/23 |
| 2016/0132058 | A1* | 5/2016 | Lee | G05D 1/0214 701/26 |
| 2016/0282943 | A1* | 9/2016 | Laurendeau | G06F 3/016 |
| 2016/0349755 | A1* | 12/2016 | Kuwahara | B60W 40/13 |
| 2017/0203785 | A1* | 7/2017 | Naik | B62D 5/0463 |

* cited by examiner

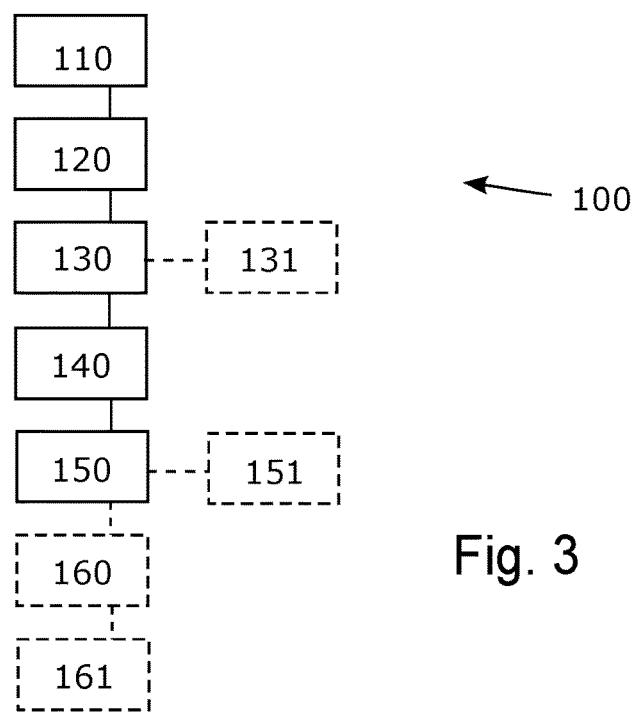

VEHICLE STEERING ARRANGEMENT, AUTONOMOUS VEHICLE STEERING ARRANGEMENT, A VEHICLE, AND A METHOD OF STEERING A VEHICLE

CROSS-REFERENCE TO RELATED APPLICATIONS

This application claims foreign priority benefits under 35 U.S.C. § 119(a)-(d) to European patent application number EP 15198393.9, filed Dec. 8, 2015, which is incorporated by reference in its entirety.

TECHNICAL FIELD

The present disclosure relates to a vehicle steering arrangement for a vehicle, an autonomous vehicle steering arrangement, a vehicle and a method of steering a vehicle, using a vehicle steering arrangement.

BACKGROUND

Almost all cars available on the market today have some sort of power assist steering system arranged to assist a driver in steering steered wheels of the vehicle. Most car manufacturers have started to use Electrical Power Assist Systems (EPAS) in their vehicles, phasing out the formerly used Hydraulic Power Assist Systems (HPAS). The reason for doing so is weight savings, space savings and reduced manufacturing costs of EPAS compared to HPAS. In addition, electrical systems have an advantage in fuel efficiency because there is no belt-driven hydraulic pump constantly running, whether assistance is required or not. However, in general, an EPAS isolates more of the road contact feedback and therefore provides lower level of feedback of road information to the driver than an HPAS.

Some car manufacturers use steer-by-wire systems which provide steering control of a car with no mechanical components/linkages between the steering wheel and the wheels. Instead, control of the direction of the wheels is established through an electric motor, or motors, which are actuated by electronic control units monitoring steering wheel inputs from the driver using sensors. An inherent problem with a steer-by-wire system is that such systems need redundant elements to make them safe, since no mechanical connection is present between the steering wheel and the steered wheels. The cost of a steer-by-wire system is often greater than conventional systems due to greater complexity, development costs and the redundant elements needed to make the system safe. In addition, a steer-by-wire system has no natural road contact feedback to the driver so there is a need for artificial feedback to the driver from a dedicated force feedback motor.

In view of above, there is room for improvement concerning control of steering, feedback information to a driver, safety and manufacturing costs of a vehicle steering arrangement.

SUMMARY

An object of the present disclosure is to provide an improved vehicle steering arrangement that eliminates or at least reduces the problems and/or drawbacks associated with the prior art solutions.

According to an aspect of the disclosure, the object is achieved by a vehicle steering arrangement for a vehicle, comprising a rack, a position sensor arranged to sense a current position of the rack, a steering column, a steering wheel in mechanical connection with steered wheels of the vehicle via the rack and the steering column, a torque sensor arranged to sense a torque applied onto the steering wheel and arranged to provide a torque signal representative thereof, an electronic control unit provided with a virtual steering model, a rack-mounted electromechanical actuator arranged to selectively apply a force onto the rack, and a force obtaining arrangement, configured to obtain forces of the steered wheels acting on the rack, wherein the electronic control unit is configured to provide a virtual rack position based on the virtual steering model and at least a combination of the obtained forces and the torque signal, wherein the electronic control unit is arranged to control the rack-mounted electromechanical actuator such that the current position of the rack is controlled towards the virtual rack position.

Since the electronic control unit is configured to provide a virtual rack position based on the virtual steering model and at least a combination of the obtained forces of the steered wheels acting on the rack and the torque signal representative of the torque applied onto the steering wheel, a desired feedback to a driver can be provided while maintaining attenuation of road disturbances.

In addition, since the steering wheel is in mechanical connection with steered wheels of the vehicle via the rack and the steering column, a safe vehicle steering arrangement is provided without the need for redundant back-up elements.

Further, a vehicle steering arrangement is provided which can be manufactured in a cost efficient manner.

Even further, since the vehicle steering arrangement comprises a rack-mounted electromechanical actuator arranged to selectively apply a force onto the rack, the position of the rack can be controlled in a fast, direct and exact manner. Thus, an improved control of steering is provided.

Still further, since the electronic control unit is provided with a virtual steering model and since the electronic control unit is arranged to control the rack-mounted electromechanical actuator such that the current position of the rack is controlled towards the virtual rack position, the virtual steering model can effectively determine the feedback force felt by the driver, and a vehicle steering arrangement is provided capable of achieving a tailored, desired and consistent steering feel. Further, a vehicle steering arrangement is provided capable of achieving the tailored, desired and consistent steering feel for a wide range of vehicle models. Even further, the vehicle steering arrangement may achieve the tailored, desired and consistent steering feel in a manner being less dependent on underlying hardware components.

Still further, a vehicle steering arrangement is provided facilitating integration of advanced steering functions such as lane-keeping aid, driver steering support near a handling limit of the vehicle, autonomous vehicle steering, desired haptic feedback signals, such as lane-keeping assist haptic guidance, etc. In addition, a vehicle steering arrangement is provided which allows for a quick, safe and smooth transition to and from such advanced steering functions.

As a result, an improved vehicle steering arrangement is provided that eliminates or at least reduces the problems and/or drawbacks associated with the prior art solutions.

Thus, the above mentioned object is achieved.

Optionally, the force obtaining arrangement comprises the rack-mounted electromechanical actuator, the position sensor and the electronic control unit, where the force obtaining arrangement is configured to obtain the forces by comparing a current speed of the rack with at least one of an electric current supplied to the rack-mounted electromechanical actuator and an electric voltage supplied to the rack-mounted electromechanical actuator. As a result, the forces of the steered wheels acting on the rack can be obtained in a direct and efficient manner without the need for separate sensors assigned for the task. Since the forces are obtained in a direct and efficient manner, control of steering may be further improved. In addition, since the forces of the steered wheels acting on the rack can be obtained without the need for separate sensors assigned for the task, the vehicle steering arrangement can be provided in a cost efficient manner.

Optionally, the arrangement comprises a movement sensor arranged to monitor movement of the vehicle, and wherein the electronic control unit is further configured to provide the virtual rack position based on the monitored movement. Since the electronic control unit is further configured to provide the virtual rack position based on the monitored movement, an even further improved control of steering is provided.

Optionally, the arrangement comprises the steered wheels and a vehicle suspension suspending the steered wheels, wherein a mechanical trail of the vehicle suspension is configured to be lower than a peak value of a pneumatic trail of the steered wheels, and wherein the electronic control unit is arranged to control the rack-mounted electromechanical actuator to provide an active aligning torque. An effect of the mechanical trail of the vehicle suspension being configured to be lower than a peak value of a pneumatic trail of the steered wheels is that it allows for a quicker steering of the vehicle hosting the vehicle steering arrangement. Further, influence of a mechanical self-aligning torque will be low. As a result, an even further improved control of steering can be provided. Even further, since influence of a mechanical self-aligning torque will be low, a total aligning torque will also be low, which reduces forces of the steered wheels acting on the rack. As a result, a smaller, a less powerful and a less costly rack-mounted electromechanical actuator can be used than would be the case if the mechanical trail of the vehicle suspension was configured to be higher than a peak value of a pneumatic trail of the steered wheels.

Even further, since the influence of a mechanical self-aligning torque will be low and since the electronic control unit is arranged to control the rack-mounted electromechanical actuator to provide an active aligning torque, the active aligning torque may be adjusted to match a driving situation, a monitored driving environment, a driver preference, etc., in a greater range, and to a larger extent, than would be possible with a high influence of a mechanical self-aligning torque. Accordingly, also as a result of this reason, an even further improved control of steering can be provided.

Optionally, the mechanical trail of the vehicle suspension is within the range of 1-3 cm.

Optionally, the arrangement comprises at least one driving environment monitoring unit arranged to monitor a driving environment surrounding the vehicle, and wherein the virtual steering model is configured to adapt a steering characteristic of the vehicle steering arrangement in dependence of the monitored driving environment. Since the virtual steering model is configured to adapt a steering characteristic of the vehicle steering arrangement in dependence of the monitored driving environment, a desired steering characteristic can be provided which will depend on the monitored driving environment. Since the vehicle steering arrangement comprises an electronic control unit provided with the virtual steering model, the steering characteristic can be adapted simply by adapting parameters of the virtual steering model in dependence of the monitored driving environment. In this manner, the steering characteristic can easily be adapted in dependence of the monitored driving environment. According to some embodiments, the electronic control unit is arranged to gradually adjust the steer control to match the response of a conventional Electrical Power Assist System (EPAS), in dependence of the monitored driving environment. As a result, an even further improved control of steering can be performed.

Optionally, the virtual steering model is configured to adapt a steering characteristic of the vehicle steering arrangement in dependence of a driver preference. As a result, desired steering characteristic is provided which will depend on the driver preference. A driver thus may choose, actively or passively, a suitable steering characteristic. Since the vehicle steering arrangement comprises an electronic control unit provided with the virtual steering model, the steering characteristic can be adapted simply by adapting parameters of the virtual steering model in dependence of the driver preference. In this manner, the steering characteristic can easily be adapted in dependence of the driver preference. As a result, an improved control of steering is performed.

Optionally, the vehicle steering arrangement comprises a movement sensor arranged to monitor lateral acceleration and yaw rate of the vehicle, wherein the electronic control unit is configured to provide a current road friction estimate by comparing the lateral acceleration, the yaw rate, a current position of the rack and the virtual rack position. As a result, a vehicle steering arrangement is provided capable of providing a current road friction estimate in a quick and reliable manner. The current road friction estimate may be used as a further input by the electronic control unit. In such embodiments, the electronic control unit is further configured to provide the virtual rack position based on the current road friction estimate. As a result, an even further improved control of steering is performed, which is performed in dependence of a current road friction. As an alternative, or in addition, the current road friction estimate may be used by other applications and vehicle control systems of the vehicle such as adaptive cruise control systems, collision mitigation systems, etc.

Further embodiments herein aim to provide an autonomous vehicle steering arrangement comprising a vehicle steering arrangement according to some embodiments. The vehicle steering arrangement utilized by the autonomous vehicle steering arrangement allows for a smooth transition to and from an autonomous mode in which the autonomous vehicle steering arrangement autonomously steers the vehicle.

Optionally, the autonomous vehicle steering arrangement is configured to autonomously steer the vehicle hosting the arrangement by moving the virtual rack position.

Further embodiments herein aim to provide a vehicle comprising a vehicle steering arrangement according to some embodiments or an autonomous vehicle steering arrangement according to some embodiments.

A further object of the present disclosure is to provide an improved method of steering a vehicle that eliminates or at least reduces the problems and/or drawbacks associated with the prior art solutions.

According to an aspect of the disclosure, the object is achieved by a method of steering a vehicle using a vehicle steering arrangement, comprising a rack, a position sensor, a steering column, a steering wheel in mechanical connection with steered wheels of the vehicle via the rack and the steering column, a torque sensor, an electronic control unit provided with a virtual steering model, a rack-mounted electromechanical actuator arranged to selectively apply a force onto the rack, and a force obtaining arrangement, wherein the method comprises:

sensing a current position of the rack, using the position sensor, sensing a torque applied onto the steering wheel and providing a torque signal representative thereof, using the torque sensor, obtaining forces of the steered wheels acting on the rack, using the force obtaining arrangement, providing a virtual rack position based on the virtual steering model and at least a combination of the obtained forces and the torque signal, using the electronic control unit, and controlling the rack-mounted electromechanical actuator such that the current position of the rack is controlled towards the virtual rack position, using the electronic control unit.

Since the method comprises providing a virtual rack position based on the virtual steering model and at least a combination of the obtained forces of the steered wheels acting on the rack and the torque signal representative of the torque applied onto the steering wheel, a desired feedback to a driver can be provided while maintaining attenuation of road disturbances.

Further, since the method comprises controlling the rack-mounted electromechanical actuator such that the current position of the rack is controlled towards the virtual rack position, a method is provided capable of achieving a tailored, desired and consistent steering feel. Further, a method is provided capable of achieving the tailored, desired and consistent steering feel for a wide range of vehicle models, irrespective of underlying hardware components.

Still further, a method is provided facilitating integration of advanced steering functions such as lane-keeping aid, driver steering support near a handling limit of the vehicle, autonomous vehicle steering, desired haptic feedback signals, such as lane-keeping assist haptic guidance, etc.

As a result, an improved method of steering a vehicle is provided that eliminates or at least reduces the problems and/or drawbacks associated with the prior art solutions.

Thus, the above mentioned object is achieved.

Optionally, the force obtaining arrangement comprises the rack-mounted electromechanical actuator, the position sensor and the electronic control unit, wherein the method further comprises:

obtaining the forces by comparing a current speed of the rack with at least one of an electric current supplied to the rack-mounted electromechanical actuator and an electric voltage supplied to the rack-mounted electromechanical actuator, using the force obtaining arrangement.

As a result, the forces of the steered wheels acting on the rack can be obtained in a direct and efficient manner without the need for separate sensors assigned for the task. Since the forces are obtained in a direct and efficient manner, control of steering may be further improved.

Optionally, the arrangement comprises the steered wheels and a vehicle suspension suspending the steered wheels, wherein a mechanical trail of the vehicle suspension is configured to be lower than a peak value of a pneumatic trail of the steered wheels, and wherein the method further comprises:

controlling the rack-mounted electromechanical actuator to provide an active aligning torque, using the electronic control unit.

An effect of the mechanical trail of the vehicle suspension being configured to be lower than a peak value of a pneumatic trail of the steered wheels is that it allows for a quicker steering of the vehicle hosting the vehicle steering arrangement. Further, influence of a mechanical self-aligning torque will be low. As a result, an even further improved control of steering is provided.

Even further, since the influence of a mechanical self-aligning torque will be low and since the method comprises controlling the rack-mounted electromechanical actuator to provide an active aligning torque, the active aligning torque may be adjusted to match a driving situation, a monitored driving environment, a driver preference etc., in a greater range, and to a larger extent, than would be possible with a high influence of a mechanical self-aligning torque. Accordingly, also as a result of this reason, an even further improved control of steering is provided.

Optionally, the arrangement further comprises a movement sensor, and the method further comprises:

monitoring lateral acceleration and yaw rate of the vehicle, using the movement sensor, and providing a current road friction estimate by comparing the monitored lateral acceleration, the monitored yaw rate, a current position of the rack and the virtual rack position, using the electronic control unit.

As a result, a method is provided capable of providing a current road friction estimate in a quick and reliable manner. The current road friction estimate may be used as a further input by the electronic control unit. In such embodiments, the method further comprises providing the virtual rack position based on the current road friction estimate. As a result, an even further improved control of steering is performed, which is performed in dependence of a current road friction.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings.

FIG. 3 illustrates a method of steering a vehicle using a vehicle steering arrangement.

DETAILED DESCRIPTION

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
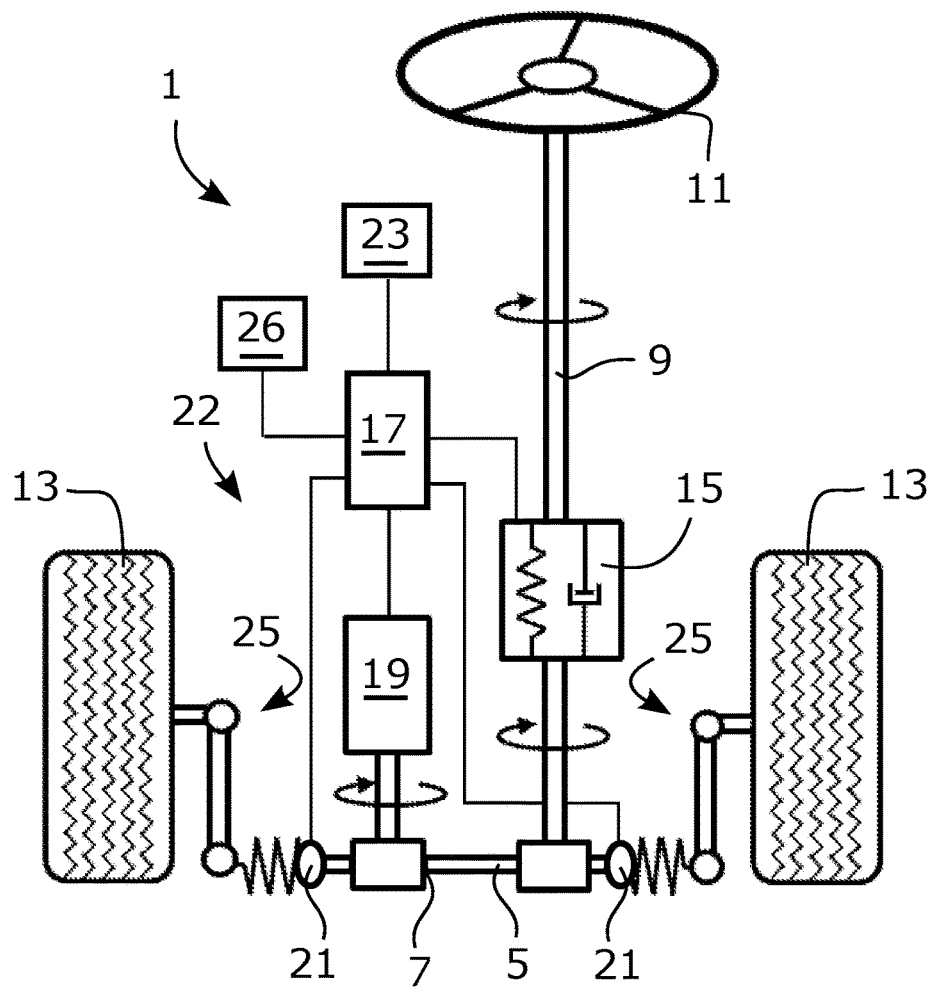
FIG. 1 illustrates vehicle steering arrangement for a vehicle.

FIG. 1 illustrates vehicle steering arrangement 1 for a vehicle. The arrangement 1 comprises a rack 5 and a position sensor 7 arranged to sense a current position of the rack 5. The arrangement 1 further comprises a steering column 9 and a steering wheel 11 in mechanical connection with steered wheels 13 of the vehicle hosting the arrangement 1 via the rack 5 and the steering column 9. The rack 5 may comprise an elongated arm provided with elements such as teeth, trails or similar. The steering column 9 may comprise a cogwheel, or similar, arranged to intermesh with the elements of the rack 5 such that a rotational movement of the steering column 9 is transferred to a linear movement of the rack 5 and vice versa. The arrangement 1 further comprises a torque sensor 15 arranged to sense a torque applied onto the steering wheel 11 and arranged to provide a torque signal representative thereof. The torque sensor 15 may comprise a torsion bar arranged to twist by an amount proportional to the torque applied onto the steering wheel 11 and a sensor arranged to sense the amount of twist to thereby provide a torque signal representative of the torque applied onto the steering wheel 11.

The arrangement 1 further comprises an electronic control unit 17 provided with a virtual steering model. Further, the arrangement 1 comprises a rack-mounted electromechanical actuator 19 arranged to selectively apply a force onto the rack 5. The rack-mounted electromechanical actuator 19 may be arranged at the rack 5 and may be arranged to selectively apply a force onto the rack 5 either directly or via a transmission. However, the rack-mounted electromechanical actuator 19 is arranged to apply the force onto the rack 5 without the applied force passing the steering column 9. The rack-mounted electromechanical actuator 19 may further be arranged around the rack 5. The rack-mounted electromechanical actuator 19 may comprise an electric motor and a transmission where the transmission is arranged to transfer a rotational movement of the motor to a linear movement of the rack 5. Further, the rack-mounted electromechanical actuator 19 may comprise a linear electric motor.

The position sensor 7 arranged to sense the current position of the rack 5 may comprise a separate sensor arranged to sense the current position of the rack 5 or the steering column 9, or may be integral to another component, such as a transmission of the rack-mounted electromechanical actuator 19, as is illustrated in FIG. 1, or the rack-mounted electromechanical actuator 19. In addition, the position sensor 7 may be arranged at a position between the steering wheel 11 and the torque sensor 15. In such embodiments, the position of the rack 5 may be determined by adding the amount of twist of the torque sensor 15 to values obtained by the position sensor. Further, the position sensor 7 may comprise and utilize a combination of sensors and/or sensor-inputs to sense the current position of the rack 5. For example, the position sensor 7 may comprise a sensor sensing the angle of the steering wheel 11 and an encoder for the rack-mounted electromechanical actuator 19. By using a combination of sensors and/or sensor-inputs to sense the current position of the rack 5, a more accurate sensing can be provided.

The arrangement 1 further comprises a force obtaining arrangement 22 configured to obtain forces of the steered wheels 13 acting on the rack 5.

The electronic control unit 17 is configured to provide a virtual rack position based on the virtual steering model and at least a combination of the obtained forces of the steered wheels 13 acting on the rack 5 and the torque signal representative of the torque applied onto the steering wheel 11. The electronic control unit 17 is further arranged to control the rack-mounted electromechanical actuator 19 such that the current position of the rack 5 is controlled towards the virtual rack position.

Thereby, the virtual steering model can effectively determine the feedback force felt by the driver and a vehicle steering arrangement 1 is provided capable of achieving a tailored, desired and consistent steering feel. Further, a vehicle steering arrangement 1 is provided capable of attenuating steering wheel disturbances that would otherwise occur due to road unevenness or tire imbalances. Still further, a vehicle steering arrangement 1 is provided facilitating integration of advanced steering functions such as lane-keeping aid, driver steering support near a handling limit of the vehicle, autonomous vehicle steering, desired haptic feedback signals, such as lane-keeping assist haptic guidance, etc., a desired feedback to a driver can be provided while maintaining attenuation of road disturbances and the position of the rack 5 can be controlled in a fast, direct and exact manner. Incorporation of desired haptic feedback signals can be provided by selectively applying a force onto said rack 5 by, using the rack-mounted electromechanical actuator 19.

The virtual steering model is a virtual representation of a vehicle steering arrangement. The virtual steering model may comprise parameters representative of friction, stiffness, damping, steering inertia, dynamic transient behavior, and/or return stiffness of a vehicle steering arrangement. In addition, the virtual steering model may comprise parameters representative of the vehicle hosting the vehicle steering arrangement 1 such as handling characteristics, transient characteristics, dynamic transient behavior, mass, center of gravity location, wheel base and effective axle characteristics of the vehicle. Thus, in such embodiments, the feedback force felt by the driver will be provided, not only based on a model of a vehicle steering arrangement, but also based on a model of the vehicle hosting the vehicle steering arrangement 1. As a result, an even further improved control of steering is provided, and a vehicle steering arrangement 1 is provided where the capability of achieving a tailored, desired and consistent steering feel is further improved. The virtual steering model and the parameters of the virtual steering model may be provided using a frequency response function on an existing vehicle steering arrangement, or obtained otherwise e.g., using computer simulations.

According to some embodiments, the electronic control unit 17 is further configured to provide an estimated applying force based on the virtual steering model and at least a combination of the obtained forces and the torque signal, i.e., based on the virtual steering model and at least forces of the steered wheels 13 acting on the rack 5 and the torque applied onto the steering wheel 11. In such embodiments, the electronic control unit 17 is arranged to control the rack-mounted electromechanical actuator 19 such that the current position of the rack 5 is controlled towards the virtual rack position, by applying the estimated applying force onto the rack 5. Thereby, an even further improved control of steering is provided. Also, since steering wheel 11 in mechanical connection with steered wheels 13 of the vehicle 3 via the rack 5 and the steering column 9, the estimated applying force will form part of the feedback force felt by the driver. As a result, a vehicle steering arrangement 1 is provided where the capability of achieving a tailored, desired and consistent steering feel is even further improved.

The electronic control unit 17 may be configured to provide a virtual rack speed based on a difference between the current position of the rack 5 and the virtual rack position and be arranged to control the rack-mounted electromechanical actuator 19 such that a current speed of the rack 5 is controlled towards the virtual rack speed. The electronic control unit 17 may further be configured to provide the virtual rack position based on data representative of body side slip angle, tire slip, current road friction estimate, steering wheel angle, steering wheel velocity and/or speed of the rack of the vehicle hosting the arrangement 1.

Road disturbances may be caused by surface irregularities of the road on which the vehicle hosting the arrangement 1 is traveling. Such road disturbances are perceived as jerks of the steering wheel of a conventional vehicle steering arrangement. According to the vehicle steering arrangement 1 provided, such road disturbances will effectively be attenuated since such road disturbances are not present in the virtual steering model. That is, road disturbances causing the steered wheels 13 to apply a force onto the rack 5 will be attenuated since the electronic control unit 17 is arranged to control the rack-mounted electromechanical actuator 19 such that the current position of the rack 5 is controlled towards the virtual rack position. Since the vehicle steering arrangement 1 comprises a rack-mounted electromechanical actuator 19 arranged to selectively apply a force onto the rack 5 either directly or via a transmission, without the applied force passing the steering column 9, forces of the steered wheels 13 acting on the rack 5 can be attenuated in a fast, direct and exact manner.

According to some embodiments, the force obtaining arrangement 22 comprises the rack-mounted electromechanical actuator 19, the position sensor 7 and the electronic control unit 17. In such embodiments, the force obtaining arrangement 22 is configured to obtain the forces of the steered wheels 13 acting on the rack 5 by comparing a current speed of the rack 5 with at least one of an electric current supplied to the rack-mounted electromechanical actuator 19 and an electric voltage supplied to the rack-mounted electromechanical actuator 19. As a result, the forces of the steered wheels 13 acting on the rack 5 can be obtained in a direct and efficient manner without the need for separate sensors assigned for the task. Since the forces are obtained in a direct and efficient manner, control of steering may be further improved.

According to some embodiments, the force obtaining arrangement 22 comprises the electronic control unit 17 and sensors 21 arranged to sense the forces of the steered wheels 13 acting on the rack 5. Thus, in such embodiments, force obtaining arrangement 22 obtains the forces of the steered wheels 13 acting on the rack 5 using the sensors 21. As is illustrated in FIG. 1, the force obtaining arrangement 22 may comprise two sensors 21, one for each steered wheel 13 where the sensors 21 are arranged at a respective end, and/or at a respective side of the rack 5. The sensors 21 may be piezoelectric force sensors.

According to some embodiments, the arrangement 1 comprises a movement sensor 23 arranged to monitor movement of the vehicle hosting the arrangement 1, and wherein the electronic control unit 17 is further configured to provide the virtual rack position based on the monitored movement. Thereby, an even further improved control of steering is provided. The movement sensor may comprise an accelerometer arranged to monitor a lateral acceleration and yaw rate of the vehicle hosting the arrangement 1. As an alternative, or in addition, the movement sensor 23 may comprise a velocity sensor arranged to monitor a longitudinal velocity of the vehicle hosting the arrangement 1. In such embodiments, the electronic control unit 17 is configured to provide the virtual rack position based on at least one of the monitored lateral acceleration, the monitored yaw rate and the monitored longitudinal velocity of the vehicle hosting the arrangement 1. In addition the electronic control unit 17 may further be configured to provide the estimated applying force based on said monitored movement, and arranged to control the rack-mounted electromechanical actuator 19 such that the current position of the rack 5 is controlled towards the virtual rack position, by applying the estimated applying force onto the rack 5. Thereby, an even further improved control of steering may be provided.

Optionally, the arrangement 1 comprises the steered wheels 13 and a vehicle suspension 25 suspending the steered wheels 13, wherein a mechanical trail of the vehicle suspension 25 is configured to be lower than a peak value of a pneumatic trail of the steered wheels 13, and wherein the electronic control unit 17 is arranged to control the rack-mounted electromechanical actuator 19 to provide an active aligning torque. Accordingly, the active aligning torque will augment the self-aligning torque obtained via the steered wheels, which will be relatively low.

The total aligning torque is the product of the lateral force and the sum of the mechanical and pneumatic trail. The mechanical trail of the vehicle suspension 25 can be defined as the side view distance between the steering axis and the vertical line through the center of the steered wheel 13 at the ground plane. When the intersection of the steering axis with the ground plane is in front of the wheel center the mechanical trail is positive. The mechanical trail is a direct result of the caster angle when the wheel center is on the steering axis in side view. However, the mechanical trail can also be changed with a spindle offset. The spindle offset is the side view distance, parallel to the ground plane, between the wheel center and the steering axis. When the wheel center is in front of the steering axis, the spindle offset is negative and the mechanical trail will be reduced according to the spindle offset. The mechanical trail referred to herein is intended to encompass a positive mechanical trail where the intersection of the steering axis with the ground plane is in front of the wheel center.

The mechanical trail of the vehicle suspension 25 may be adapted such that the mechanical trail of the vehicle suspension 25 is lower than a peak value of a pneumatic trail of the steered wheels 13 by having certain caster angles and/or certain spindle offset of the vehicle suspension 25. The pneumatic trail is the side view distance between the vertical line through the center of the steered wheel 13 and the instantaneous lateral force pressure center at the ground plane, which is a function of tire construction, the instantaneous vertical as well as lateral loading. The above is a simplified example of the aligning torque ignoring e.g., longitudinal forces and camber effects.

An effect of the mechanical trail of the vehicle suspension 25 being configured to be lower than a peak value of a pneumatic trail of the steered wheels 13 is that it allows for a quicker steering of the vehicle hosting the arrangement 1. Since a quicker steering is allowed for, control of the rack-mounted electromechanical actuator, i.e., control of steering, may adjusted to match a driving situation, a monitored driving environment, a driver preference, etc., in a greater range, and to a larger extent, than would be possible with a slower steering, i.e., higher mechanical trail of the vehicle suspension 25. Accordingly, due to these features, an even further improved control of steering can be provided.

A further effect of the mechanical trail of the vehicle suspension 25 being configured to be lower than a peak value of a pneumatic trail of the steered wheels 13 is that influence of a mechanical self-aligning torque will be low. Accordingly, forces of the steered wheels 13 acting on the rack 5 will also be low. Thereby, a less powerful rack-mounted electromechanical actuator 19 can be used than would be the case if the mechanical trail of the vehicle suspension 25 was configured to be higher than a peak value of a pneumatic trail of the steered wheels 13. In addition, since the influence of a mechanical self-aligning torque will be low, and since the electronic control unit 17 in these embodiments may be arranged to control the rack-mounted electromechanical actuator to provide an active aligning torque, the active aligning torque may be adjusted to provide a controlled steering feel, a proper guidance, may be adjusted to match a driving situation, a monitored driving environment, a driver preference, etc., in a greater range, and to a larger extent, than would be possible with a high influence of mechanical self-aligning torque. Accordingly, also as a result of these features, an even further improved control of steering can be provided.

According to some embodiments, the mechanical trail of the vehicle suspension 25 is within the range of 1-3 cm. According to further embodiments, the mechanical trail of the vehicle suspension 25 is within the range of 1.2-2.8 cm, or 1.4-2.6 cm, or 1.6-2.4 cm, or 1.8-2.2 cm, or 1.9-2.1 cm, or approximately 2 cm. By having a mechanical trail of the vehicle suspension 25 within such ranges, the mechanical trail of the vehicle suspension 25 will be lower than a peak value of a pneumatic trail of the steered wheels 13.

Figure 2:
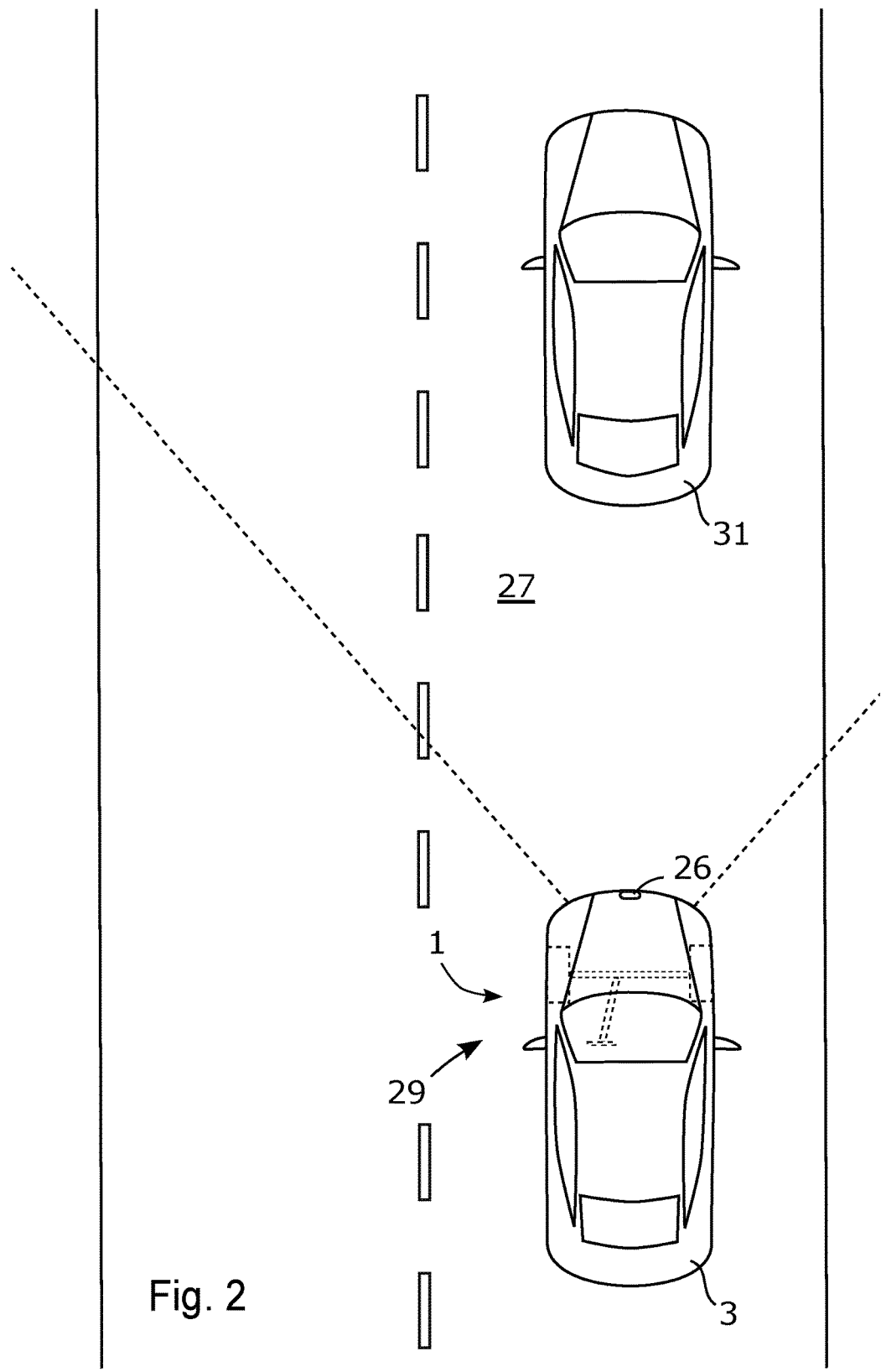
FIG. 2 illustrates a vehicle comprising a vehicle steering arrangement according to some embodiments.

FIG. 2 illustrates a vehicle 3 comprising a vehicle steering arrangement 1 according to some embodiments. The arrangement 1 illustrated in FIG. 2 comprises at least one driving environment monitoring unit 26 arranged to monitor a driving environment 27 surrounding the vehicle 3, and wherein the virtual steering model is configured to adapt a steering characteristic of the vehicle steering arrangement 1 in dependence of the monitored driving environment 27.

The driving environment monitoring unit 26 may comprise one or more sensors such as RADAR (RAdio Detection And Ranging) sensors and/or LASER (Light Amplification by Stimulated Emission of Radiation) sensors, and/or LIDAR (LIght Detection And Ranging) sensors, or one or more imaging sensors, such as one or more camera units. In addition, the driving environment monitoring unit 26 may comprise a positioning unit and an electronic map where the positioning unit may comprise a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System. The driving environment monitoring unit 26 may be configured to monitor a distance to a preceding vehicle 31 preceding the vehicle 3 hosting the arrangement 1 and a relative velocity between the vehicle 3 hosting the arrangement 1 and the preceding vehicle 31. The driving environment monitoring unit 26 may further be configured to monitor a profile of an upcoming section of the road on which the host vehicle 3 is travelling, as well as be configured to monitor presence of, and location of, on road objects, lane markers, and road users, such as other vehicles and pedestrians.

Since the vehicle steering arrangement 1 comprises an electronic control unit 17 provided with the virtual steering model, the steering characteristic can be adapted simply by adapting parameters of the virtual steering model in dependence of the monitored driving environment 27. In this manner, the steering characteristic can easily be adapted in dependence of the monitored driving environment 27. The steering characteristics may be adapted in terms of steering weight, on-centering stiffness, feedback levels, vibration cancelling, etc.

In embodiments where the mechanical trail of the vehicle suspension 25 is configured to be lower than a peak value of a pneumatic trail of the steered wheels 13, the adaptation of the steering characteristic of the vehicle steering arrangement 1 in dependence of the monitored driving environment 27 is extra advantageous. This is due to the quicker steering allowed for when the mechanical trail of the vehicle suspension 25 is lower than a peak value of a pneumatic trail of the steered wheels 13. A quicker steering of the vehicle 3 can be perceived as a nervous behavior of the vehicle 3 by a vehicle driver. Thus, by monitoring the driving environment 27 surrounding the vehicle 3, and by adapting the steering characteristic of the vehicle steering arrangement 1 in dependence of the monitored driving environment 27, the behavior of the vehicle perceived by the vehicle driver can be adapted in dependence of the monitored driving environment 27 and thus in dependence of a current driving situation.

Further, according to some embodiments, the active aligning torque is provided in dependence of the monitored driving environment 27. The active aligning torque may further be provided in dependence of data from the movement sensor 23 arranged to monitor the vehicle 3 vehicle hosting the arrangement 1. Such data may for example be data representative of longitudinal velocity, lateral acceleration, and yaw rate of the vehicle 3 hosting the arrangement 1. Thus, in such embodiments, active aligning torque may be provided in dependence of a current driving situation as well as in dependence of movement of the vehicle. In addition, incorporation of desired haptic feedback signals can be provided by selectively applying a force onto said rack by, using the rack-mounted electromechanical actuator in dependence of the monitored driving environment 27.

Further, according to some embodiments, the electronic control unit 17 is arranged to gradually adjust the steer control to match the response of a conventional Electrical Power Assist System (EPAS). Thus, the electronic control unit 17 may be arranged to control steering based on a blend between a feedforward control involving a pure amplification of the torque applied onto the steering wheel 11, and the virtual steer control based on the virtual steering model. Such blend may be performed in dependence of the monitored driving environment 27. In some situations, such as when driving on unknown and un-identified road surface conditions, steer control matching the response of a conventional EPAS could prove more effective. Thus, by gradually adjusting the steer control to match the response of a conventional EPAS, in dependence of the monitored driving environment 27, an even further improved control of steering can be performed.

According to some embodiments, the virtual steering model is configured to adapt a steering characteristic of the vehicle steering arrangement 1 in dependence of a driver preference. In such embodiments, a driver may choose, actively or passively, a suitable steering characteristic. Since the vehicle steering arrangement 1 comprises an electronic control unit 17 provided with the virtual steering model, the steering characteristic can be adapted simply by adapting parameters of the virtual steering model in dependence of the driver preference. In this manner, the steering characteristic can easily be adapted in dependence of the driver preference.

In embodiments where the mechanical trail of the vehicle suspension 25 is configured to be lower than a peak value of a pneumatic trail of the steered wheels 13, the adaptation of the steering characteristic of the vehicle steering arrangement 1 in dependence of the a driver preference is extra advantageous due to the quicker steering allowed for. Thus, the steering characteristic of the vehicle steering arrangement 1 can be adapted, in a greater range, and to a larger extent, than would be possible if the mechanical trail of the vehicle suspension 25 was configured to be higher than a peak value of a pneumatic trail of the steered wheels 13. Accordingly, a vehicle steering arrangement 1 is provided allowing a driver to choose between a sportier steering characteristic and a more relaxed steering characteristic. The steering characteristics may be adapted in terms of steering weight, on-centering stiffness, feedback levels, vibration cancelling, etc.

According to some embodiments, the vehicle steering arrangement 1 comprises a movement sensor 23 arranged to monitor lateral acceleration and yaw rate of the vehicle 3, wherein the electronic control unit 17 is configured to provide a current road friction estimate by comparing the lateral acceleration, the yaw rate, a current position of the rack 5 and the virtual rack position. As an alternative, or in addition, the electronic control unit 17 is configured to provide a current road friction estimate by comparing the lateral acceleration, the yaw rate, a current speed of the rack 5 and a virtual rack speed. In such embodiments, the virtual rack speed is a desired speed of the rack calculated by the electronic control unit 17, desired to reach the virtual rack position.

As an alternative, or in addition, the electronic control unit 17 is configured to provide a further current road friction estimate by comparing the lateral acceleration, the yaw rate, and obtained forces of the wheels 13 acting on the rack 5. As used herein, the aforementioned current road friction estimate may be represented by a first current road friction estimate. Similarly, the directly above introduced further current road friction estimate may be represented by a second current road friction estimate. According to some embodiments, the electronic control unit 17 is configured to adjust or verify the current road friction estimate by comparing the current road friction estimate and the further current road friction estimate. In such embodiment, an even more reliable current road friction estimate can be provided.

The current road friction estimate and/or the further current road friction estimate may be used as further inputs to the electronic control unit 17. In such embodiments, the electronic control unit 17 is further configured to provide the virtual rack position based on the current road friction estimate and/or the further current road friction estimate. As a result, an even further improved control of steering is performed, which is performed in dependence of a current road friction.

In embodiments where the force obtaining arrangement 22 obtains the forces of the steered wheels 13 acting on the rack 5 using two sensors 21, one for each steered wheel 13, the electronic control unit 17 may be configured to provide a further current road friction estimate for each steered wheel 13 by comparing the lateral acceleration, the yaw rate, and forces of each wheel 13 acting on the rack 5. Thereby, a further current road friction estimate can be provided for a steered wheel at one side of the vehicle and a further current road friction estimate for the steered wheel at the other side of the vehicle. Such further current road friction estimates may be used as inputs to the electronic control unit 17, where the electronic control unit 17 is further configured to provide the virtual rack position based on the further current road friction estimates for each steered wheel 13. As a result, an improved control of steering is performed, which is performed in dependence of the further current road friction for each steered wheel 13. The further current road friction estimates for each steered wheel 13 may be used by other applications and vehicle control systems of the vehicle, such as an anti-lock braking system, an adaptive cruise control system, a collision mitigation system, etc.

In the above described embodiments, the electronic control unit 17 may configured to provide a current road friction estimate using a tire model, such as a brush tire model. That is, the electronic control unit 17 may be configured to provide a current road friction estimate by comparing the lateral acceleration, the yaw rate, a current position of the rack 5 and the virtual rack position, using the tire model, such as the brush tire model. As an alternative, or in addition, the electronic control unit 17 is configured to provide a further current road friction estimate by comparing the lateral acceleration, the yaw rate, and obtained forces of the wheels 13 acting on the rack 5, using the tire model, such as the brush tire model.

In embodiments where the mechanical trail of the vehicle suspension 25 is configured to be lower than a peak value of a pneumatic trail of the steered wheels 13, the ability of the electronic control unit 17 to provide the current road friction estimate as well as the further current road friction estimate will be further improved. This is due to the fact that in these embodiments, the pneumatic self-aligning torque will contribute to the total self-aligning torque to a higher degree than would be the case otherwise. For small slip angles, lateral force is relatively unaffected by a limit of steered wheel adhesion, making it difficult to distinguish between different friction limits before the limits are reached. However, pneumatic trail is sensitive to the friction limit even when lateral force is in the linear region of handling, offering the potential to enable early prediction of the tire's handling limits as well as offering an improved ability for the electronic control unit 17 to provide the current road friction estimate as well as the further current road friction estimate.

FIG. 2 also illustrates an autonomous vehicle steering arrangement 29 comprising a vehicle steering arrangement 1 according to some embodiments. The autonomous vehicle steering arrangement 29 is configured to autonomously steer the vehicle 3 hosting the arrangement 1 by moving the virtual rack position. Thereby, an autonomous vehicle steering arrangement 29 is provided configured to autonomously steer the vehicle 3 hosting the arrangement 1 simply by moving the virtual rack position of the vehicle steering arrangement 1. Further, autonomous vehicle steering arrangement 29 is provided which can be manufactured in a cost efficient manner and be able to control the position of the rack in a fast, direct and exact manner.

The autonomous vehicle steering arrangement 29 may utilize data from the driving environment monitoring unit 26 and/or one or more additional sensor units to interpret the driving environment 27 and move the virtual rack position in dependence thereof to autonomously steer the vehicle 3.

The vehicle steering arrangement 1 utilized by the autonomous vehicle steering arrangement 29 allows for a smooth transition to and from an autonomous mode in which the autonomous vehicle steering arrangement 29 autonomously steers the vehicle 3.

FIG. 3 illustrates a method 100 of steering a vehicle using a vehicle steering arrangement, comprising a rack, a position sensor, a steering column, a steering wheel in mechanical connection with steered wheels of the vehicle via the rack and the steering column, a torque sensor, an electronic control unit provided with a virtual steering model, a rack-mounted electromechanical actuator arranged to selectively apply a force onto the rack, and a force obtaining arrangement, wherein the method 100 comprises:

sensing 110 a current position of the rack, using the position sensor, sensing 120 a torque applied onto the steering wheel and providing a torque signal representative thereof, using the torque sensor, obtaining 130 forces of the steered wheels acting on the rack, using the force obtaining arrangement, providing 140 a virtual rack position based on the virtual steering model and at least a combination of the obtained forces and the torque signal, using the electronic control unit, and controlling 150 the rack-mounted electromechanical actuator such that the current position of the rack is controlled towards the virtual rack position, using the electronic control unit.

According to some embodiments, the method comprises:

providing an estimated applying force based on the virtual steering model and at least a combination of the obtained forces and the torque signal, using the electronic control unit, and controlling the rack-mounted electromechanical actuator to apply the estimated applying force onto the rack such that the current position of the rack is controlled towards the virtual rack position, using the electronic control unit.

According to some embodiments, the force obtaining arrangement comprises the rack mounted electromechanical actuator, the position sensor and the electronic control unit, and as illustrated in FIG. 3, the method 100 may further comprise:

obtaining 131 the forces by comparing a current speed of the rack with at least one of an electric current supplied to the rack-mounted electromechanical actuator and an electric voltage supplied to the rack-mounted electromechanical actuator, using the force obtaining arrangement.

According to some embodiments, the arrangement comprises the steered wheels and a vehicle suspension suspending the steered wheels, wherein a mechanical trail of the vehicle suspension is configured to be lower than a peak value of a pneumatic trail of the steered wheels, and as illustrated in FIG. 3, the method 100 may further comprise:

controlling 151 the rack-mounted electromechanical actuator to provide an active aligning torque, using the electronic control unit.

According to some embodiments, the arrangement further comprises a movement sensor, and as illustrated in FIG. 3, the method 100 may further comprise:

monitoring 160 lateral acceleration and yaw rate of the vehicle, using the movement sensor, and providing 161 a current road friction estimate by comparing the monitored lateral acceleration, the monitored yaw rate, a current position of the rack and the virtual rack position, using the electronic control unit.

As one skilled in the art would understand, the electronic control unit 17, force obtaining arrangement 22, driving environment monitoring unit 26, and any other unit, arrangement or system described herein (e.g., autonomous steering arrangement 29) may individually, collectively, or in any combination comprise suitable hardware, such as one or more processors (e.g., one or more microprocessors, microcontrollers and/or programmable digital signal processors) in communication with, or configured to communicate with, one or more storage devices or media including computer readable program instructions that are executable by the one or more processors so that the unit, arrangement or system may perform particular algorithms represented by the functions and/or operations described herein. Any of the above described units, arrangements or systems may also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. The words used in the specification are words of description rather than limitation, and it is understood that various changes may be made without departing from the spirit and scope of the disclosure.

What is claimed is:

1. A vehicle steering arrangement for a vehicle, the steering arrangement comprising:

a rack;

a position sensor to sense a current position of the rack;

a steering column;

a steering wheel configured to be in mechanical connection with steerable wheels of the vehicle via the rack and the steering column;

a torque sensor to sense a torque applied onto the steering wheel and to provide a torque signal representative thereof;

an electronic control unit provided with a virtual steering model;

a rack-mounted electromechanical actuator to selectively apply a force onto the rack; and a force obtaining arrangement configured to obtain forces of the wheels acting on the rack;

wherein the electronic control unit is configured to provide a virtual rack position based on the virtual steering model and at least a combination of the obtained forces and the torque signal, wherein the electronic control unit is configured to control the rack-mounted electromechanical actuator such that the current position of the rack is controlled towards the virtual rack position, wherein the force obtaining arrangement comprises the rack-mounted electromechanical actuator, the position sensor and the electronic control unit, and wherein the force obtaining arrangement is configured to obtain the forces by comparing a current speed of the rack with at least one of an electric current supplied to the rack-mounted electromechanical actuator or an electric voltage supplied to the rack-mounted electromechanical actuator.

2. The steering arrangement according to claim 1, further comprising a movement sensor to monitor movement of the vehicle, wherein the electronic control unit is further configured to provide the virtual rack position based on the monitored movement.

3. The steering arrangement according to claim 1, wherein the steering arrangement comprises the wheels and a vehicle suspension suspending the wheels, wherein a mechanical trail of the vehicle suspension is configured to be lower than a peak value of a pneumatic trail of the wheels, and wherein the electronic control unit is arranged to control the rack-mounted electromechanical actuator to provide an active aligning torque.

4. The steering arrangement according to claim 3, wherein the mechanical trail of the vehicle suspension is within the range of 1-3 cm.

5. The steering arrangement according to claim 1, further comprising at least one driving environment monitoring unit to monitor a driving environment surrounding the vehicle, and wherein the virtual steering model is configured to adapt a steering characteristic of the steering arrangement in dependence of the monitored driving environment.

6. The steering arrangement according to claim 1, wherein the virtual steering model is configured to adapt a steering characteristic of the steering arrangement in dependence of a driver preference.

7. The steering arrangement according to claim 1, further comprising a movement sensor to monitor lateral acceleration and yaw rate of the vehicle, wherein the electronic control unit is configured to provide a current road friction estimate by comparing the lateral acceleration, the yaw rate, a current position of the rack and the virtual rack position.

8. An autonomous vehicle steering arrangement comprising the vehicle steering arrangement according to claim 1.

9. The autonomous vehicle steering arrangement according to claim 8, wherein the autonomous vehicle steering arrangement is configured to autonomously steer the vehicle hosting the arrangement by moving the virtual rack position.

10. A vehicle comprising the autonomous vehicle steering arrangement according to claim 8.

11. A vehicle comprising the vehicle steering arrangement according to claim 1.

12. A method of steering a vehicle using a vehicle steering arrangement comprising a rack, a steering column, and a steering wheel in mechanical connection with steerable wheels of the vehicle via the rack and the steering column, the method comprising:
sensing a current position of the rack using a position sensor of the steering arrangement;
sensing a torque applied onto the steering wheel and providing a torque signal representative thereof using a torque sensor of the steering arrangement;
obtaining forces of the wheels acting on the rack using a force obtaining arrangement of the steering arrangement;
providing a virtual rack position based on a virtual steering model and at least a combination of the obtained forces and the torque signal using an electronic control unit of the steering arrangement;
controlling a rack-mounted electromechanical actuator of the steering arrangement such that the current position of the rack is controlled toward the virtual rack position using the electronic control unit; and
obtaining the forces by comparing a current speed of the rack with at least one of an electric current supplied to the rack-mounted electromechanical actuator or an electric voltage supplied to the rack-mounted electromechanical actuator, using the force obtaining arrangement;
wherein the force obtaining arrangement comprises the rack-mounted electromechanical actuator, the position sensor and the electronic control unit.

13. The method according to claim 12, wherein the steering arrangement comprises the wheels and a vehicle suspension suspending the wheels, wherein a mechanical trail of the vehicle suspension is configured to be lower than a peak value of a pneumatic trail of the wheels, and wherein the method further comprises:
controlling the rack-mounted electromechanical actuator to provide an active aligning torque using the electronic control unit.

14. The method according to claim 12, wherein the steering arrangement further comprises a movement sensor, and wherein the method further comprises:
monitoring lateral acceleration and yaw rate of the vehicle using the movement sensor; and
providing a current road friction estimate by comparing the monitored lateral acceleration, the monitored yaw rate, a current position of the rack and the virtual rack position, using the electronic control unit.

15. A vehicle steering arrangement for a vehicle, the steering arrangement comprising:
a rack;
a position sensor to sense a current position of the rack;
a steering column;
steerable wheels;
a steering wheel configured to be in mechanical connection with the wheels via the rack and the steering column;
a vehicle suspension suspending the wheels, wherein a mechanical trail of the vehicle suspension is configured to be lower than a peak value of a pneumatic trail of the wheels;
a torque sensor to sense a torque applied onto the steering wheel and to provide a torque signal representative thereof;
an electronic control unit provided with a virtual steering model;
a rack-mounted electromechanical actuator to selectively apply a force onto the rack; and
a force obtaining arrangement configured to obtain forces of the wheels acting on the rack;
wherein the electronic control unit is configured to provide a virtual rack position based on the virtual steering model and at least a combination of the obtained forces and the torque signal, wherein the electronic control unit is configured to control the rack-mounted electromechanical actuator such that the current position of the rack is controlled towards the virtual rack position, and wherein the electronic control unit is arranged to control the rack-mounted electromechanical actuator to provide an active aligning torque.

16. The steering arrangement according to claim 15, further comprising a movement sensor to monitor movement of the vehicle, wherein the electronic control unit is further configured to provide the virtual rack position based on the monitored movement.

17. The steering arrangement according to claim 15, wherein the mechanical trail of the vehicle suspension is in the range of 1-3 cm.

18. The steering arrangement according to claim 15, further comprising at least one driving environment monitoring unit to monitor a driving environment surrounding the vehicle, and wherein the virtual steering model is configured to adapt a steering characteristic of the steering arrangement in dependence of the monitored driving environment.

19. A method of steering a vehicle using a vehicle steering arrangement comprising a rack, a steering column, steerable wheels, a steering wheel in mechanical connection with the wheels via the rack and the steering column, and a vehicle suspension suspending the wheels, wherein a mechanical trail of the vehicle suspension is configured to be lower than a peak value of a pneumatic trail of the wheels, the method comprising:
sensing a current position of the rack using a position sensor of the steering arrangement;
sensing a torque applied onto the steering wheel and providing a torque signal representative thereof using a torque sensor of the steering arrangement;

obtaining forces of the wheels acting on the rack using a force obtaining arrangement of the steering arrangement;

providing a virtual rack position based on a virtual steering model and at least a combination of the obtained forces and the torque signal using an electronic control unit of the steering arrangement;

controlling a rack-mounted electromechanical actuator of the steering arrangement such that the current position of the rack is controlled toward the virtual rack position using the electronic control unit; and controlling the rack-mounted electromechanical actuator to provide an active aligning torque using the electronic control unit.

20. The method according to claim 19, wherein the steering arrangement further comprises a movement sensor, and wherein the method further comprises:

monitoring lateral acceleration and yaw rate of the vehicle using the movement sensor; and providing a current road friction estimate by comparing the monitored lateral acceleration, the monitored yaw rate, a current position of the rack and the virtual rack position, using the electronic control unit.

* * * * *